US009468144B2

(12) United States Patent
Kurioka et al.

(10) Patent No.: US 9,468,144 B2
(45) Date of Patent: Oct. 18, 2016

(54) LAWN MOWER CUTTER BLADE (71) Applicant: HONDA MOTOR CO., LTD., Tokyo (JP)

(72) Inventors: Shunsuke Kurioka, Wako (JP); Shingo Tsuruoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/670,634

(22) Filed: Mar. 27, 2015

(65) Prior Publication Data
US 2015/0271997 A1    Oct. 1, 2015

(30) Foreign Application Priority Data

Mar. 27, 2014  (JP) .................................. 2014-066491

(51) Int. Cl.
    *A01D 34/73*    (2006.01)
    *A01D 34/82*    (2006.01)
    *A01D 34/68*    (2006.01)

(52) U.S. Cl.
CPC .............. *A01D 34/826* (2013.01); *A01D 34/68* (2013.01); *A01D 34/73* (2013.01)

(58) Field of Classification Search
CPC ...... A01D 34/63; A01D 34/66; A01D 34/68; A01D 34/685; A01D 34/73; A01D 34/733; A01D 34/826; A01D 2101/00
See application file for complete search history.

(56) References Cited

U.S. PATENT DOCUMENTS

| | | | | |
|---|---|---|---|---|
| 640,587 | A * | 1/1900 | Pollock ................... | A01D 34/73 56/295 |
| 1,550,342 | A * | 8/1925 | Cogley ..................... | A01G 3/08 172/41 |
| 1,744,597 | A * | 1/1930 | Vasconcellos ......... | A01B 39/22 172/556 |
| 1,992,494 | A * | 2/1935 | Lundin .............. | A01D 34/6806 56/17.2 |
| 2,517,405 | A * | 8/1950 | Moss ..................... | A01D 34/63 37/243 |
| 2,850,862 | A * | 9/1958 | Asbury ................ | A01D 34/736 30/347 |
| 3,087,298 | A * | 4/1963 | Phillips, Sr. ........... | A01D 34/73 56/295 |

(Continued)

FOREIGN PATENT DOCUMENTS

| | | | | |
|---|---|---|---|---|
| DE | 102004006163 A1 * | 9/2004 | ............. | A01D 34/73 |
| DE | 102006058958 A1 * | 6/2008 | ............. | A01D 34/73 |

(Continued)

*Primary Examiner* — Robert Pezzuto
*Assistant Examiner* — Joan D Misa
(74) *Attorney, Agent, or Firm* — Rankin, Hill & Clark LLP (57) ABSTRACT

A lawn mower includes: a rotation shaft extending vertically in a downwardly-opening housing; and a cutter blade rotatably mounted on the rotation shaft. The cutter blade is an elongated member extending in opposite horizontal directions and having two bent sections formed on respective ones of its longitudinally opposite end portions. The two bent sections are bent in opposite directions as viewed in the axial direction of the rotation shaft. The cutter blade has, on each of the bent sections, a convex cutter blade section formed along a convex edge of the bent section and a concave cutter blade section formed along a concave edge of the bent section. The convex cutter blade section on each of the bent sections has a smaller cutting edge angle than the concave cutter blade section.

4 Claims, 10 Drawing Sheets

(56) References Cited

U.S. PATENT DOCUMENTS

| | | | | |
|---|---|---|---|---|
| 3,343,352 A * | 9/1967 | Freedlander | A01D 34/73 | 29/463 |
| 3,343,355 A * | 9/1967 | Freedlander | A01D 34/73 | 56/295 |
| 3,425,200 A * | 2/1969 | Freedlander | A01D 34/73 | 56/295 |
| 3,447,291 A * | 6/1969 | Guetterman | A01D 34/14 | 56/295 |
| 3,485,022 A * | 12/1969 | Freedlander | A01D 34/73 | 56/295 |
| 3,570,229 A * | 3/1971 | Freedlander | A01D 34/73 | 56/295 |
| 3,781,991 A * | 1/1974 | Stretton | A01D 34/902 | 30/276 |
| 4,031,696 A * | 6/1977 | Fleigle | A01D 34/73 | 56/11.9 |
| 4,214,426 A * | 7/1980 | Lindblad | A01D 34/826 | 56/17.5 |
| 4,250,621 A * | 2/1981 | Houle | A01D 34/73 | 30/347 |
| 4,250,622 A * | 2/1981 | Houle | A01D 34/73 | 30/347 |
| 4,302,878 A * | 12/1981 | Bonforte | A01D 34/73 | 30/347 |
| 4,461,139 A * | 7/1984 | Hernandez | A01D 46/08 | 56/13.3 |
| 4,611,459 A * | 9/1986 | Cartner | A01D 34/73 | 56/12.7 |
| 4,706,446 A * | 11/1987 | Doi | A01D 34/66 | 30/347 |
| 4,893,457 A * | 1/1990 | Castain | A01D 34/73 | 56/295 |
| 4,995,228 A * | 2/1991 | Hladik, Jr. | A01D 34/73 | 56/255 |
| 5,012,633 A * | 5/1991 | Ito | A01D 43/077 | 56/12.9 |
| 5,299,414 A * | 4/1994 | Long | A01D 34/005 | 56/17.4 |
| 5,394,612 A * | 3/1995 | Wolfington | A01D 34/73 | 30/276 |
| 5,438,819 A * | 8/1995 | Dallman | A01D 34/73 | 56/17.5 |
| D389,382 S * | 1/1998 | Houle | D8/8 | |
| 5,711,141 A * | 1/1998 | Pitman | A01D 34/73 | 56/255 |
| 5,791,131 A * | 8/1998 | Hill | A01D 34/733 | 56/229 |
| 5,890,354 A * | 4/1999 | Bednar | A01D 34/005 | 56/255 |
| 6,415,591 B1 * | 7/2002 | Tylka, Sr. | A01D 34/73 | 56/255 |
| 6,427,341 B1 * | 8/2002 | Lee | A01D 34/4168 | 30/276 |
| 6,470,662 B1 * | 10/2002 | Burke | A01D 34/73 | 56/255 |
| 6,640,449 B1 * | 11/2003 | Hoffmann | A01D 34/73 | 30/347 |
| D524,827 S * | 7/2006 | Byrne | D15/29 | |
| 7,127,877 B2 * | 10/2006 | Curran | A01D 34/73 | 56/255 |
| 7,614,574 B2 * | 11/2009 | Jakobi | B02C 18/20 | 241/199.12 |
| 8,935,909 B2 * | 1/2015 | Eavenson, Sr. | A01D 34/73 | 56/255 |
| D723,345 S * | 3/2015 | Aglassinger | D8/8 | |
| 2005/0172601 A1 * | 8/2005 | Besogne | A01D 34/826 | 56/295 |
| 2009/0223193 A1 * | 9/2009 | Funnell | A01D 34/73 | 56/17.5 |
| 2013/0269306 A1 * | 10/2013 | Gilpatrick | A01D 34/73 | 56/295 |

FOREIGN PATENT DOCUMENTS

| | | | |
|---|---|---|---|
| FR | 2611422 A1 * | 9/1988 | A01D 34/73 |
| FR | 2855715 A1 * | 12/2004 | A01D 34/73 |
| JP | 2006-067918 | 3/2006 | |

* cited by examiner

LAWN MOWER CUTTER BLADE

FIELD OF THE INVENTION

The present invention relates to a rotary lawn mower with an improved cutter blade.

BACKGROUND OF THE INVENTION

Among the conventionally-known rotary lawn mowers are ones which cut grass by rotating a cutter blade, accommodated in a downwardly-opening housing, along the grass on a lawn. In recent years, improvement of cutter blades of lawn mowers has been under way. One example of such lawn mowers is disclosed in Japanese Patent Application Laid-open No. 2006-67918 (hereinafter referred to as "the relevant patent literature").

The lawn mower disclosed in the relevant patent literature includes a downwardly-opening housing, a rotation shaft extending in a vertical (up-down) direction in the housing, and upper and lower cutter blades accommodated within the housing for rotation about the rotation shaft. The upper cutter blade has a blade section formed along the front edge, in the rotating direction of the upper cutter blade, for cutting grass on a lawn. The lower cutter blade has a blade section formed along the front edge, in the rotating direction, of the lower cutter blade, and left and right air lift sections extending from the rear edge, in the rotating direction, of the lower cutter blade while curving obliquely rearward and upward. Such a lawn mower equipped with the upper and lower cutter blades can secure good grass cutting performance.

Generally, noise (unwanted sound) would occur in lawn mowers as a cutter blade rotates. Sometimes, depending on the place where the lawn mower is used, more weight or emphasis is placed on noise suppression performance than on the grass cutting performance. As one conceivable approach, a cutter blade focusing on the grass cutting performance and another cutter blade focusing on the noise suppression performance may be prepared in advance so that switching is made as appropriate between use of the cutter blade focusing on the grass cutting performance and use of the cutter blade focusing on the noise suppression performance depending on the place where the lawn mower is used. However, because such an approach requires preparation of the two different types of cutter blades, not only the lawn mower would increase in cost, but also it would be bothersome to appropriately store the cutter blade that is not in use.

SUMMARY OF THE INVENTION

In view of the foregoing prior art problems, it is an object of the present invention to provide a technique that can provide a single cutter blade of a lawn mower with two different performance, i.e. grass cutting performance and noise suppression performance.

In order to accomplish the above-mentioned object, the present invention provides an improved lawn mower, which comprises: a rotation shaft accommodated in a downwardly-opening housing and extending vertically in the housing; and a cutter blade accommodated in the housing and rotatably mounted on the rotation shaft, the cutter blade being an elongated member extending in opposite horizontal directions with respect to the rotation shaft and having two bent sections formed on respective ones of longitudinally opposite end portions thereof. The two bent sections are bent in opposite directions as viewed in an axial direction of the rotation shaft, and the cutter blade has, on each of the bent sections, a convex cutter blade section formed along a convex edge of the bent section and a concave cutter blade section formed along a concave edge of the bent section. The convex cutter blade section on each of the bent sections has a cutting edge angle smaller than a cutting edge angle of the concave cutter blade section.

According to the present invention, the two bent sections are formed on the longitudinally opposite end portions of the elongated cutter blade, and the bent sections are bent in the opposite directions as viewed in the axial direction of the rotation shaft. The cutter blade has, on each of the bent sections, the convex cutter blade section formed along the convex edge of the bent section and the concave cutter blade section formed along the concave edge of the bent section. The convex cutter blade section on each of the bent sections has a smaller cutting edge angle than the concave cutter blade section.

When the cutter blade is rotated in such a manner that the two convex blade sections on the two bent sections are located forward in the rotating direction of the cutter blade, grass can be cut by the two convex blade sections. At that time, an entry angle of the convex blade sections to the grass is small. Thus, it is possible to reduce resistance (load) acting on the convex blade sections during the cutting of the grass. Besides, a lawn ground having been subjected to the grass cutting can have a good-looking finished surface. Namely, the lawn mower of the present invention constructed as above can have an enhanced finishing performance.

Further, the cutting edge angle of the concave blade sections is greater than the cutting edge angle of the convex blade sections. With such a great cutting edge angle of the concave blade sections, turbulence in air flows produced in an area behind in the rotating direction of the cutter blade increases, so that a negative pressure region produced in the area behind in the rotating direction of the cutter blade increases. Thus, force that causes the grass growing on the lawn ground to stand up can occur easily. As a consequence, it is possible to enhance performance of cutting the grass evenly with almost no grass left uncut, i.e. enhance the grass cutting performance of the lawn mower.

If the aforementioned cutter blade is mounted on the rotation shaft with the cutter blade vertically reversed or turned over (i.e., with the back face of the cutter blade up), the two concave blade sections are located ahead or forward in the rotating direction of the cutter blade, so that the grass can be cut by the two concave blade sections.

Further, because the cutting edge angle of each of the convex blade sections is small, air flows produced in an area behind in the rotating direction of the cutter blade have less turbulence. Thus, a negative pressure region produced in the area behind in the rotating direction of the cutter blade (rear-side negative pressure region) is relatively small. Because the cutting edge angle of each of the concave blade sections is great, on the other hand, a negative pressure region (front-side negative pressure region) occurring between the concave blade sections and the lawn ground increases. Thus, the reduction of the rear-side negative pressure region can be compensated for by the increase of the front-side negative pressure region. In this way, it is possible to supplement the force that causes the grass growing on the lawn ground to stand up. As a consequence, it is possible to enhance the performance of cutting the grass evenly with almost no grass left uncut, i.e. the grass cutting performance of the lawn mower.

Further, because the cutting edge angle of each of the convex blade sections is small, air streams passing the front and back faces smoothly join together near the cutting edge of the convex blade section and would not easily break away from each other. As a consequence, it is possible to suppress generation of noise, such as wind noise, due to the rotation of the cutter blade.

In addition, the two bent sections are bent convexly in opposite directions as viewed in the axial direction of the rotation shaft. Thus, when the cutter blade is rotated in such a manner that the concave blade sections are located forward in the rotating direction, wind produced due to the rotation of the cutter blade can be prevented by the two bent sections from flowing in an outer peripheral direction of the blade. As a consequence, it is possible to enhance the performance of suppressing noise generation due to the rotation of the cutter blade, i.e. the noise suppression performance of the lawn mower.

Namely, when the cutter blade is rotated in such a manner that the convex blade sections are located forward in the rotating direction, the grass cutting performance of the lawn mower can be enhanced. Further, when the cutter blade mounted back side up on the rotation shaft is rotated in such a manner that the concave blade sections are located forward in the rotating direction, the noise suppression performance can be enhanced. Thus, the single cutter blade can be equipped with the two different performance, the "grass cutting performance" and the "noise suppression performance".

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE INVENTION

A first embodiment of a lawn mower of the present invention will be described hereinbelow with reference to FIGS. 1 to 6. Note that, in the following description, the terms "forward", "rearward", "left", "right", "upper", "lower" etc. are used to refer to directions as viewed from a human operator operating the lawn mower.

Figure 1:
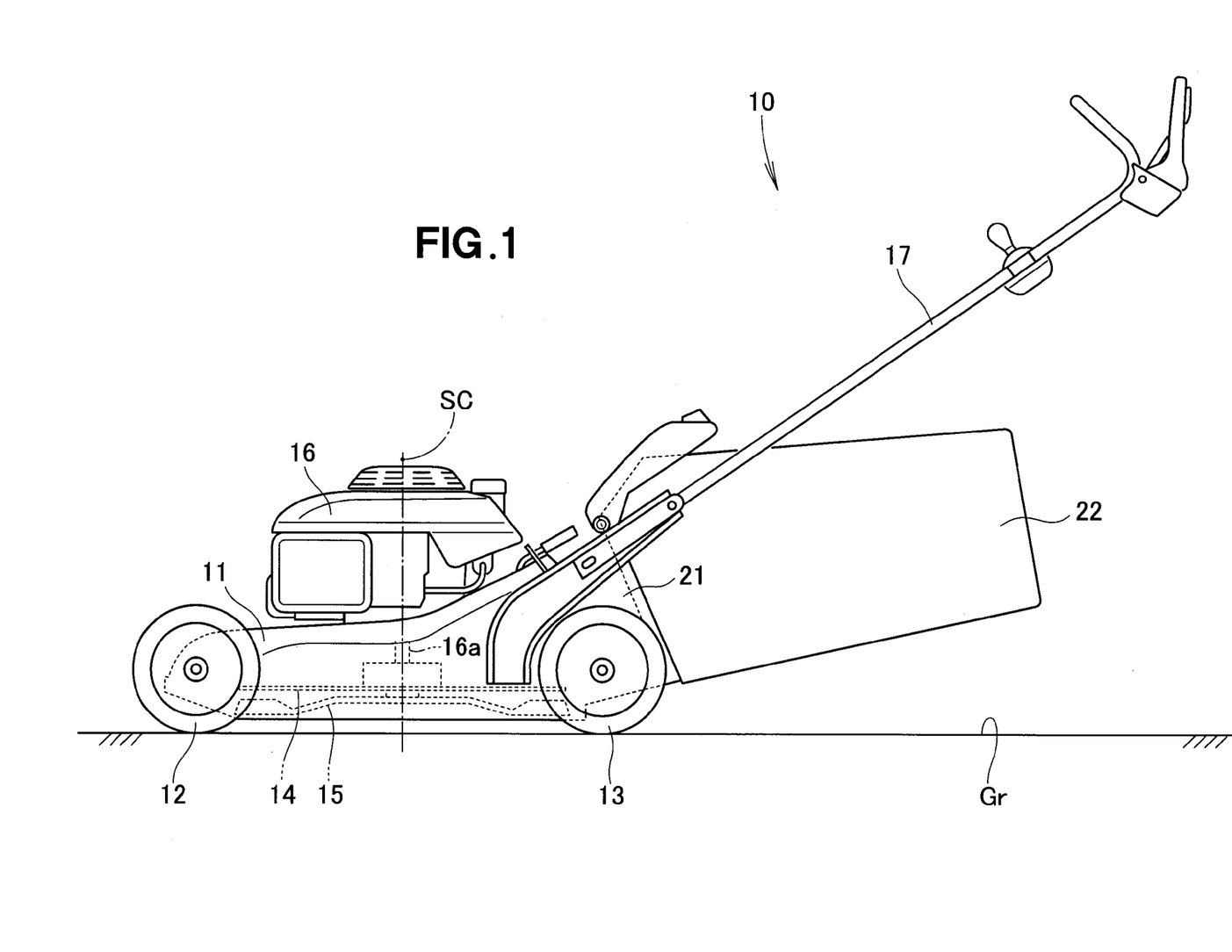
FIG. 1 is a left side view showing a first embodiment of a lawn mower of the present invention.

As shown in FIG. 1, the lawn mower 10 of the present invention is a walk-behind, self-propelled working machine, which includes: a downwardly-opening housing 11; left and right front wheels 12 provided on a front section of the housing 11; left and right rear wheels 13 provided on a rear section of the housing 11; upper and lower cutter blades 14 and 15 accommodated in a middle interior section of the housing 11; an engine (power source) 16 provided on an upper portion of the housing 11; and an operating handle 17 extending rearward from the housing 11. Note that, although the power source 16 will be described hereinbelow as being the engine, it may be an electric motor rather than being limited to the engine.

By rotating the upper and lower cutter blades 14 and 15 via the engine 16, the lawn mower 10 can not only cut grass but also produce flows of air (flows of swirling air or swirling air flows). By the swirling air flows, the grass cut by the upper and lower cutter blades 14 and 15, i.e. grass clippings, can be delivered to a grass clippings container 22 for storage therein.

The housing 11 is a downwardly-opening housing of which only the lower end surface (i.e., the surface opposed to a generally-horizontal lawn ground (ground surface) Gr) is substantially fully open. Further, the housing 11 is a member having a spiral shape as viewed in top plan, i.e. a scroll or spiral casing, which includes a scroll section for delivering the grass cut by the upper and lower blades 14 and 15 (i.e., grass clippings) to a grass clippings discharge passage 21 while swirling the grass clippings by the swirling air. The grass clippings container 22, e.g. in the form of a grass clippings bag, is detachably attached to the rear end of the grass clippings discharge passage 21. The grass clippings are delivered to the grass clippings discharge passage 21 while swirling around the output shaft 16a within the housing 11.

The housing 11 functions also as a machine body, and the engine 16 is assembled to the housing by being superimposed and bolted to the upper surface of the housing 11. The engine 16 has the output shaft 16a extending, in a direction toward the lawn ground Gr, from the lower end of the engine 16 into the housing 11. The output shaft 16a is a rotation shaft extending vertically (in an up-down direction) within the housing 11. Consequently, the output shaft (rotation shaft) 16a extends substantially vertically to the generally-horizontal lawn ground Gr, i.e. ground surface Gr.

Within the housing 11, the upper and lower cutter blades 14 and 15 are mounted on the output shaft 16a via not-shown clutches. By being driven via the engine 16, the upper and lower cutter blades 14 and 15 can rotate about the rotation shaft 16a (shaft center SC) within the housing 11.

Figure 2A:
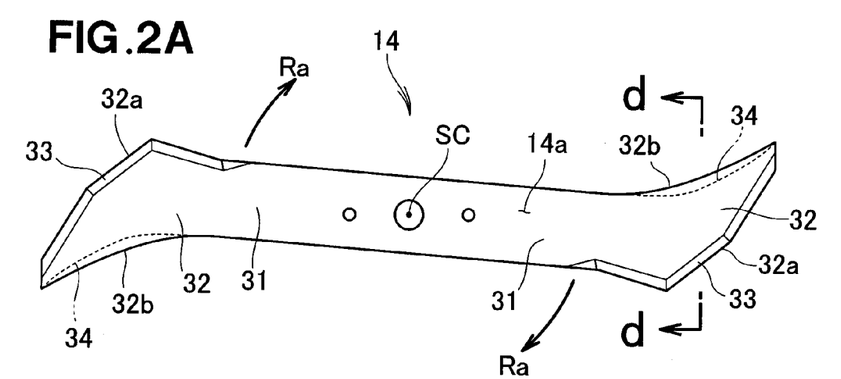
FIG. 2A is a top plan view of an upper cutter blade shown in FIG. 1.
Figure 2B:
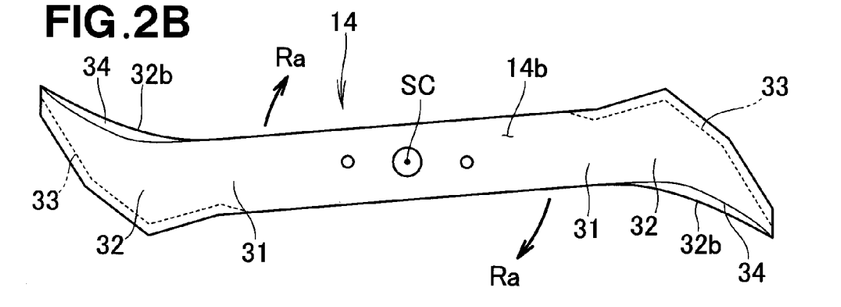
FIG. 2B is a bottom plan view of the upper cutter blade.
Figure 2C:
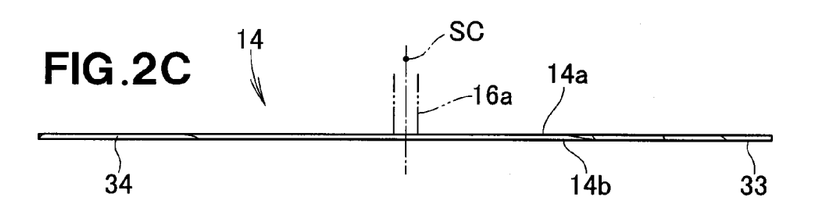
FIG. 2C is a side view of the upper cutter blade.
Figure 2D:
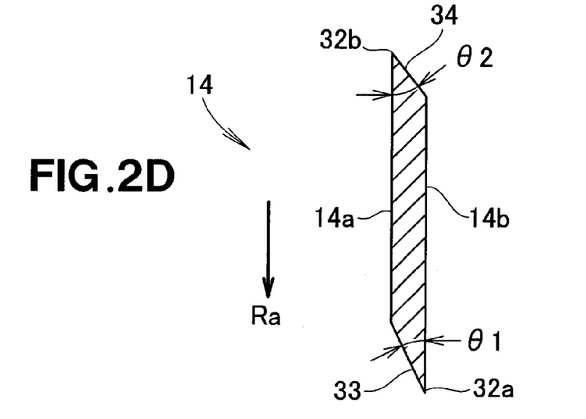
FIG. 2D is a sectional view of the upper cutter blade taken along line d-d of FIG. 2A.

FIG. 2A is a top plan view of the upper cutter blade 14 shown in FIG. 1, and FIG. 2B is a bottom plan view of the upper cutter blade 14 shown in FIG. 2A. Further, FIG. 2A is a side view of the upper cutter blade 14 shown in FIG. 2A, and FIG. 2D is a sectional view of the upper cutter blade 14 taken along the d-d line of FIG. 2A.

As shown in FIG. 2, the upper cutter blade 14 is an elongated member having a flat plate shape or band shape as viewed in plan and extending in opposite horizontal directions with respect to the rotation shaft 16a (shaft center SC). More specifically, the upper cutter blade 14 is in the form of a flat plate extending horizontally straight with respect to the rotation shaft 16a (shaft center SC).

Plate surfaces 14a and 14b of the upper cutter blade 14 face in opposite axial directions of the rotation shaft 16a. Hereinafter, the plate surface 14a facing in one of the opposite axial directions of the rotation shaft 16a (shaft center SC) will be referred to as "the one plate surface 14a", while the plate surface 14b facing in the other of the opposite axial directions of the rotation shaft 16a (shaft center SC) will be referred to as "the other plate surface 14b". Namely, the surface 14a viewed from above the upper cutter blade 14, i.e. the front face, will be referred to as "the one plate surface 14a", while the surface 14b viewed from below the upper cutter blade 14, i.e. the reverse or back face, will be referred to as "the other plate surface 14b".

Two bent sections 32 are formed at longitudinally opposite end sections 31 of the upper cutter blade 14. The two bent sections 32 are bent in opposite directions as viewed in the axial direction of the rotation shaft 16a. Namely, the upper cutter blade 14 has a so-called boomerang shape as viewed in plan.

The upper cutter blade 14 has, on each of the two bent sections 32, a convex blade sections 33 formed along a convex edge 32a of the bent section 32 and a concave blade section 34 formed along a concave edge 32b of the bent section 32.

The convex blade sections 33 and the concave blade sections 34 on the two bent sections 32 are single-side blade sections oriented in opposite directions. More specifically, as shown in FIG. 2D, each of the convex blade sections 33 has a cutting edge formed by a horizontal edge portion of the other plate surface 14b and slanting upward toward the one plate surface 14a. On the other hand, each of the concave blade sections 34 has a cutting edge formed by a horizontal edge portion of the one plate surface 14a and slanting downward toward the other plate surface 14b.

Further, as shown in FIG. 2D, each of the convex blade sections 33 has a cutting edge angle θ1 smaller than a cutting edge angle θ2 of the concave blade section 34 (i.e., θ1<θ2).

Figure 3:
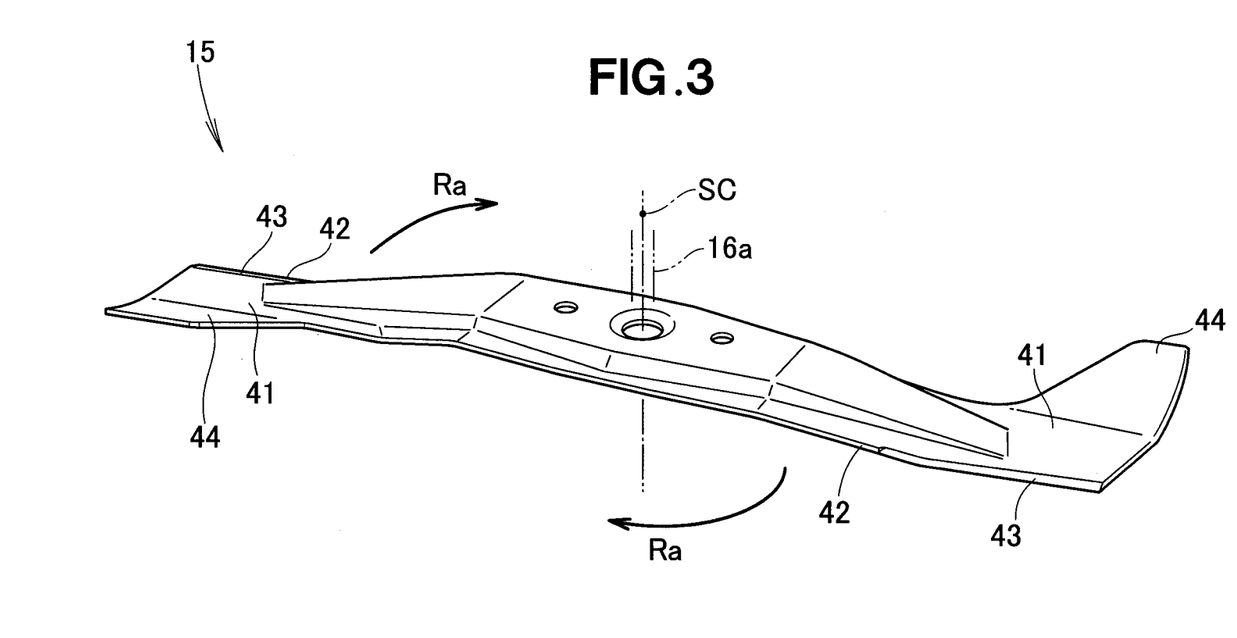
FIG. 3 is a perspective view of a lower cutter blade shown in FIG. 1.

As shown in FIG. 3, the lower cutter blade 15 is an elongated member having a flat plate or band shape as viewed in plan and extending in opposite horizontal directions with respect to the rotation shaft 16a. The lower cutter blade 15 has, on its longitudinally-opposite end sections 41, left and right blade sections 43 formed along the front edges 42 in the rotating direction Ra of the lower cutter blade 15, and left and right air lift sections 44 curved rearward and upward from the respective front edges 42. The left and right air lift sections 44 are sections for producing swirling air flows and ascending air flows as the lower cutter blade 15 rotates in the rotating direction Ra.

Figures 4A, 4B:
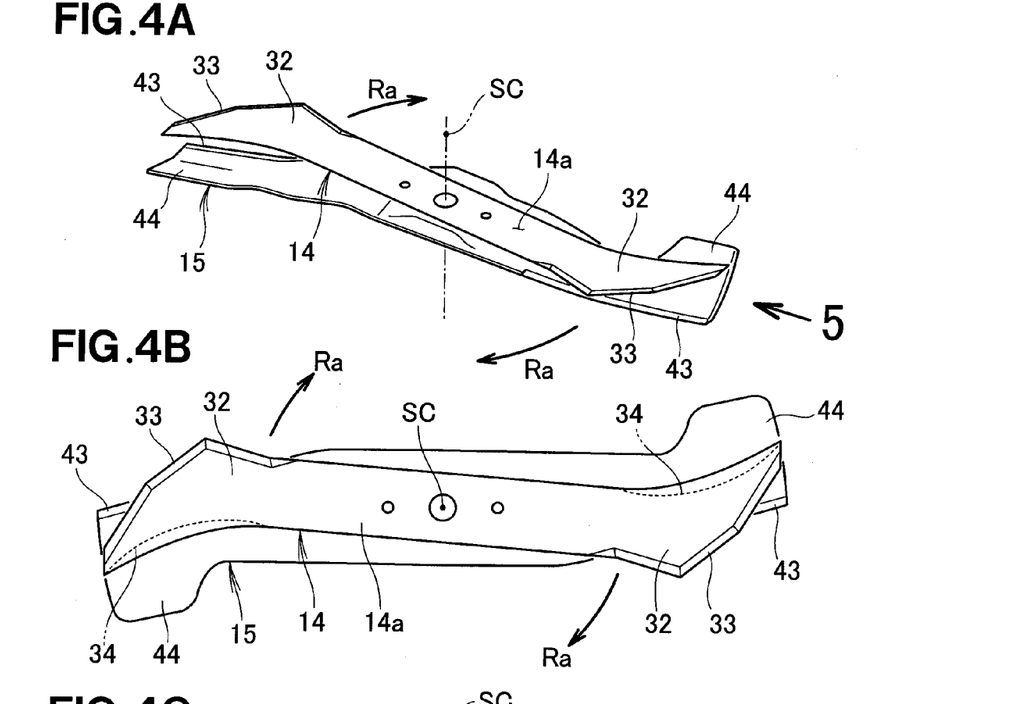
FIGS. 4A to 4D are an upper perspective view, a top plan view, a side view and a bottom plan view, respectively, of the upper and lower cutter blades shown in FIG. 1.
Figure 4C:
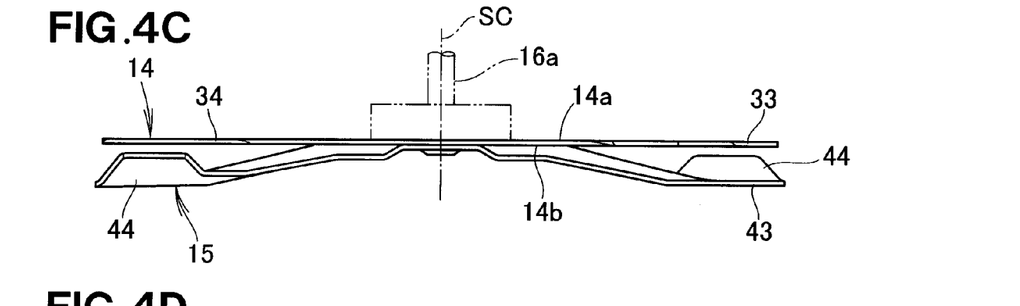
Figure 4D:
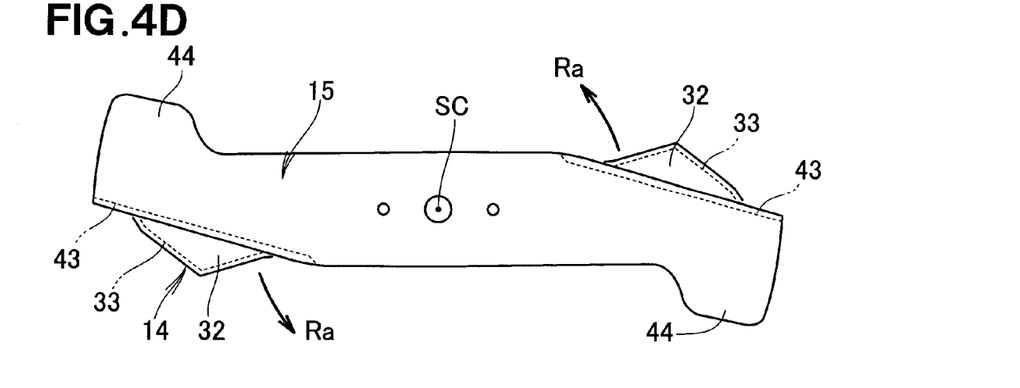

The following describe operation or behavior of the first embodiment of the lawn mower 10 constructed in the above-described manner. FIG. 4A shows the upper and lower cutter blades 14 and 15 mounted on the rotation shaft 16a with the one plate surface 14a of the upper cutter blade 14 facing or oriented upward. FIG. 4B is a top plan view of the upper and lower cutter blades 14 and 15 mounted on the rotation shaft 16a as shown in FIG. 4A. FIG. 4C is a side view of the upper and lower cutter blades 14 and 15 of FIG. 4A. FIG. 4D is a bottom plan view of the upper and lower cutter blades 14 and 15 of FIG. 4A. Further, FIG. 5 is a view of the upper and lower cutter blades 14 and 15 of FIG. 4A as viewed in a direction of arrow 5, i.e. from respective one longitudinal ends of the blades 14 and 15.

Figure 5:
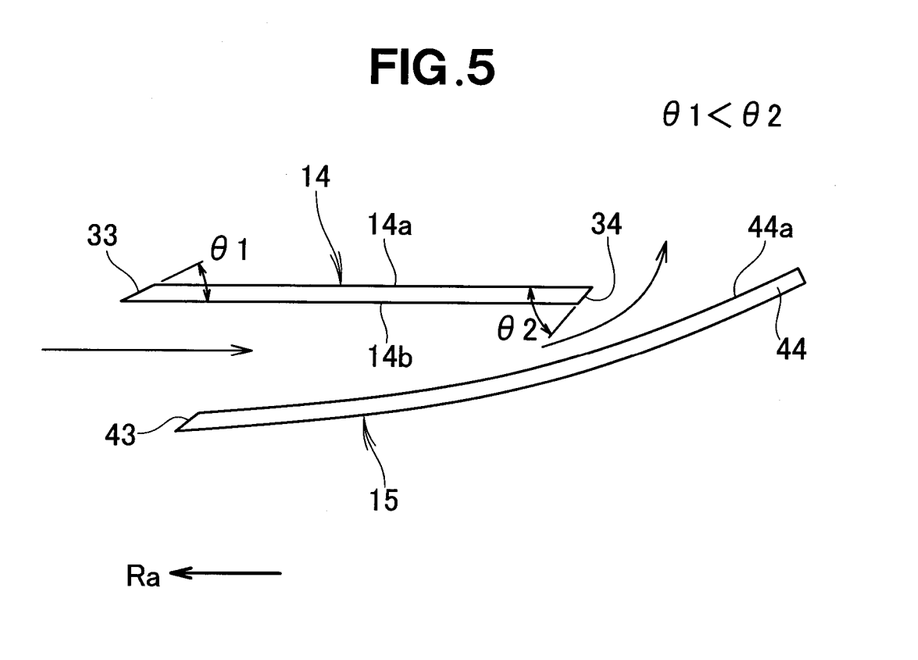
FIG. 5 is a view of the upper and lower cutter blades taken in a direction of arrow 5 of FIG. 4.

In the case where the upper cutter blade 14 is mounted on the rotation shaft 16a with the one plate surface (front face) 14a oriented upward, the two convex blade sections 33 are oriented forward in the rotating direction Ra of the upper and lower cutter blades 14 and 15, as shown in FIGS. 4 and 5.

Namely, the upper cutter blade 14 rotates in such a manner that the two convex blade sections 33 are located forward in the rotating direction Ra and grass can be cut by the convex blade sections 33. The cutting edge angle θ1 of the convex blade sections 33 is relatively small. Therefore, an entry angle of the convex blade sections 33 to the grass is small. Thus, it is possible to reduce resistance (load) acting on the convex blade sections 33 during cutting of the grass. Besides, the lawn ground Gr (see FIG. 1) having been subjected to the grass cutting can have a good-looking finished surface. Namely, the lawn mower 10 can have an enhanced finishing performance.

Further, the cutting edge angle θ2 of the concave blade sections 34 is greater than the cutting edge angle θ1 of the convex blade sections 33, as noted above. With such a great cutting edge angle θ2 of the concave blade sections 34, turbulence in air flows produced in an area located behind in the rotating direction of the upper cutter blade 14 increases, so that a negative pressure region produced in the area located behind in the rotating direction of the upper cutter blade 14 increases. Thus, force that causes the grass growing on the lawn ground Gr to stand up can occur easily. As a consequence, it is possible to enhance the performance of cutting the grass evenly with almost no grass left uncut, i.e. the grass cutting performance of the lawn mower 10.

In this case, at least a portion of the cutting edge of each of the convex blade sections 33 is located ahead or forward, in the rotating direction Ra, of the cutting edge of the corresponding blade section 43 of the lower cutter blade 15.

Because the cutting edge angle θ2 of each of the concave blade sections 34 is great, negative pressure produced between the concave blade sections 34 and the upper surfaces 44a of the air lift sections 44 of the lower cutter blade 15 is relatively great.

Figure 6:
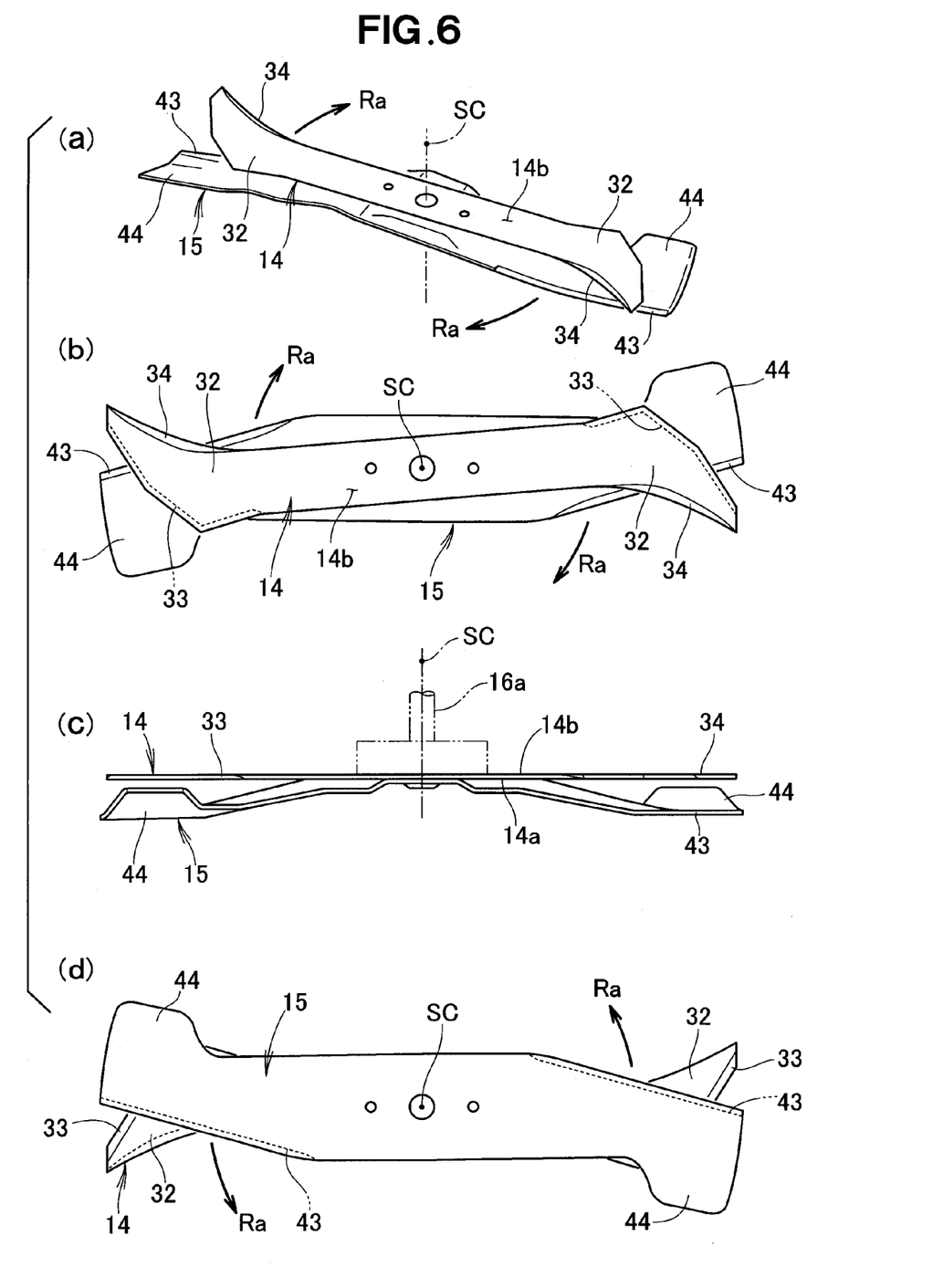
FIG. 6 is a view showing the upper cutter blade assembled to the lower cutter blade with the upper cutter blade vertically reversed or turned over (i.e., turned back face up)

If, on the other hand, the upper cutter blade 14 is mounted on the rotation shaft 16a with the upper cutter blade 14 vertically turned over (i.e. with the other plate surface (back face) 14b oriented upward) as shown in FIG. 6, the two concave blade sections 34 are oriented forward in the rotating direction Ra of the upper and lower cutter blades 14 and 15, so that the grass can be cut by the concave blade sections 34.

FIG. 6(a) shows the upper and lower cutter blades 14 and 15 mounted on the rotation shaft 16a with the other plate surface (back face) 14b oriented upward. FIG. 6(b) is a top plan view of the upper and lower cutter blades 14 and 15 shown in FIG. 6(a). FIG. 6(c) is a side view of the upper and lower cutter blades 14 and 15. Further, FIG. 6(d) is a bottom plan view of the upper and lower cutter blades 14 and 15.

Further, because the cutting edge angle θ1 of each of the convex blade sections 33 is small, air flows produced in an area located behind in the rotating direction of the upper cutter blade 14 have less turbulence. Thus, a negative pressure region produced in the area located behind in the rotating direction of the upper cutter blade 14 (rear-side negative pressure region) is relatively small. On the other hand, because the cutting edge angle θ2 of each of the concave blade sections 34 is great, a negative pressure region (front-side negative pressure region) occurring between the concave blade sections 34 and the lawn ground Gr increases. Thus, the reduction of the rear-side negative pressure region can be compensated for by the increase of the front-side negative pressure region. In this way, it is possible to supplement the force that causes the grass growing on the lawn ground Gr to stand up. As a consequence, it is possible to enhance the performance of cutting the grass evenly with almost no grass left uncut, i.e. the grass cutting performance of the lawn mower 10.

Further, because the cutting edge angle θ1 of each of the convex blade sections 33 is small, air streams passing the front and back faces smoothly join together near the cutting edge of the convex blade section 33 and would not easily break away from each other. As a consequence, it is possible to suppress generation of noise, such as wind noise, due to the rotation of the upper cutter blade 14.

Further, the two bent sections 32 are bent convexly in opposite directions as viewed in the axial direction of the rotation shaft 16a. Thus, when the upper cutter blade 14 is rotated in such a manner that the concave blade sections 34 are located forward in the rotating direction Ra, wind produced due to the rotation of the upper cutter blade 14 can be prevented by the two bent sections 32 from flowing in an outer peripheral direction of the blade 14. As a consequence, it is possible to enhance the performance of suppressing noise generation due to the rotation of the upper cutter blade 14, i.e. the noise suppression performance of the lawn mower 10.

Namely, when the upper cutter blade 14 is rotated in such a manner that the convex blade sections 33 are located forward in the rotating direction Ra, the grass cutting performance of the lawn mower 10 can be enhanced. On the other hand, when the upper cutter blade 14 mounted upside down on the rotation shaft 16a is rotated in such a manner that the concave blade sections 34 are located forward in the rotating direction Ra, the noise suppression performance can be enhanced. Thus, the single upper cutter blade 14 can be provided with the two different performance, the "grass cutting performance" and the "noise suppression performance".

The following describe, with reference to FIGS. 7 to 11, a second embodiment of the lawn mower 10A, which is characterized in that the upper cutter blade 14 in the first embodiment shown in FIG. 2 is replaced with an upper cutter blade 14A shown in FIGS. 7 to 11. The other structural elements of the second embodiment are similar to those of the above-described first embodiment, represented by the same reference numerals as used for the first embodiment and will not be described here to avoid unnecessary duplication. More specifically, the upper cutter blade 14A in the second embodiment is characterized in that the upper cutter blade 14 in the first embodiment is modified to be dividable into three members 51 to 53.

Figure 7:
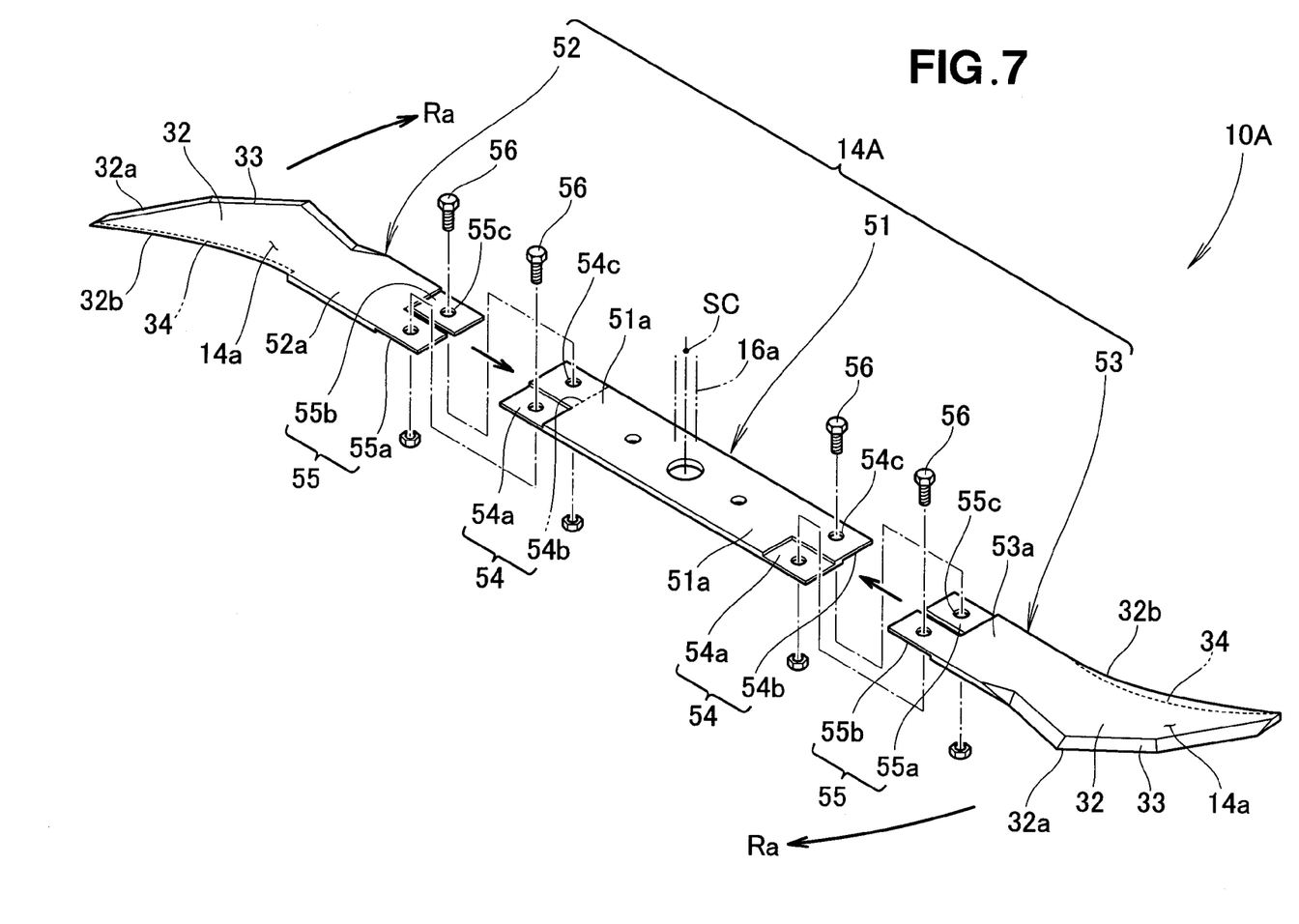
FIG. 7 is an exploded view showing an upper cutter blade in a second embodiment of the lawn mower of the present invention.
Figure 8:
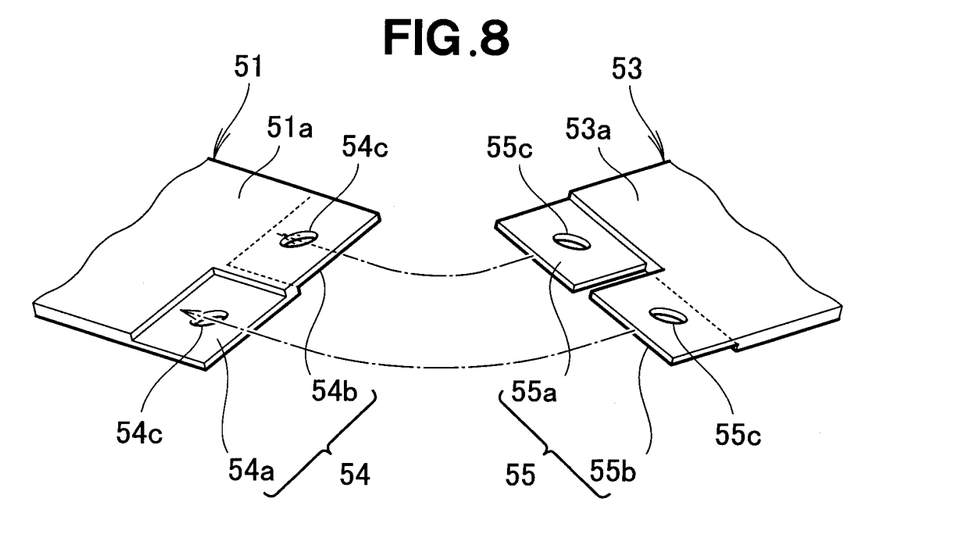
FIG. 8 is an enlarged exploded view showing respective connection sections of a middle member and a right end member of the upper cutter blade shown in FIG. 7.
Figure 9:
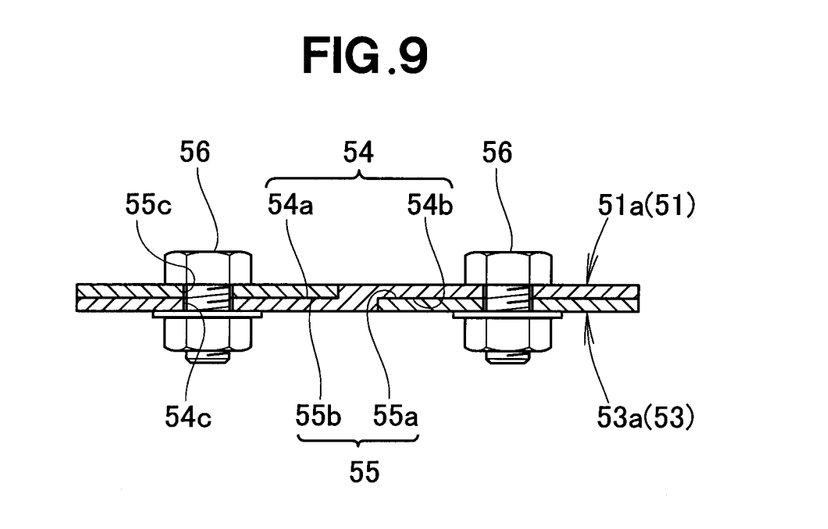
FIG. 9 is a sectional view showing the right end member connected to the middle member shown in FIG. 8.

More specifically, as shown in FIGS. 7 to 9, the upper cutter blade 14A in the second embodiment, which is an elongated member having a flat plate or band shape as viewed in plan and extending in opposite horizontal directions with respect to the rotation shaft 16a (shaft center SC) as in the first embodiment, comprises three members, a middle section or member 51 and a pair of end members 52 and 53. For each of understanding, one of the end members will be referred to as "left end member 52" while the other of the end members will be referred to as "right end member 53".

The middle member 51 is in the form of an elongated band-shaped plate mountable on the rotation shaft 16a, and it has connection sections (i.e., middle connection sections) 54 on longitudinally opposite end portions 51a thereof. The end members 52 and 53, which are each in the form of an elongated band-shaped plate, are detachably connectable to the opposite end portions 51a of the middle member 51; for this purpose, each of the end members 52 and 53 has a connection section (end connection section) 55 on one of its longitudinally opposite end portions. The single upper cutter blade 14A can be constructed by connecting the end members 52 and 53 to the middle member 51.

The overall construction of the thus-combined upper cutter blade 14A is basically (substantively) the same as the upper cutter blade 14 employed in the first embodiment shown in FIG. 2. By vertically reversing or tuning over the left and right end members 52 and 53 with respect to the middle member 51, it is possible to change the orientations of the convex blade sections 33 and the concave blade sections 34.

Each of the middle connection sections 54 includes two step surfaces 54a and 54b differing in level in a front-back (thickness) direction of the middle member 51. The two step surfaces 54a and 54b adjoin each other in a width direction of the middle member 51. One of the step surfaces 54a is a flat surface recessed from the front face of the middle member 51, while the other step surface 54b is a flat surface recessed from the back face of the middle member 51. The two step surfaces 54a and 54b each have a bolt insertion hole 54c formed through the thickness thereof.

Each of the end connection sections 55 includes two step surfaces 55a and 55b differing in level in a front-back (thickness) of the end member 52 or 53. The two step surfaces 55a and 55b adjoin each other in a width direction of the end member 52 or 53. One of the step surfaces 55a is a flat surface recessed from the front face of the end member 52 or 53, while the other step surface 55b is a flat surface recessed from the back face of the end member 52 or 53. The two step surfaces 55a and 55b each have a bolt insertion hole 55c formed through the thickness thereof.

As shown in FIGS. 8 and 9, for example, the middle member 51 and the right end member (the other end member) 53 can be connected or assembled together by the two step surfaces 55a and 55b of the right end member 53 being inserted into the step surfaces 54a and 54b of the middle member 51 and then the two step surfaces 55a and 55b and the step surfaces 54a and 54b being fastened together by means of bolts 56 inserted through the holes 54c and 55c into engagement with nuts 56.

Figure 10:
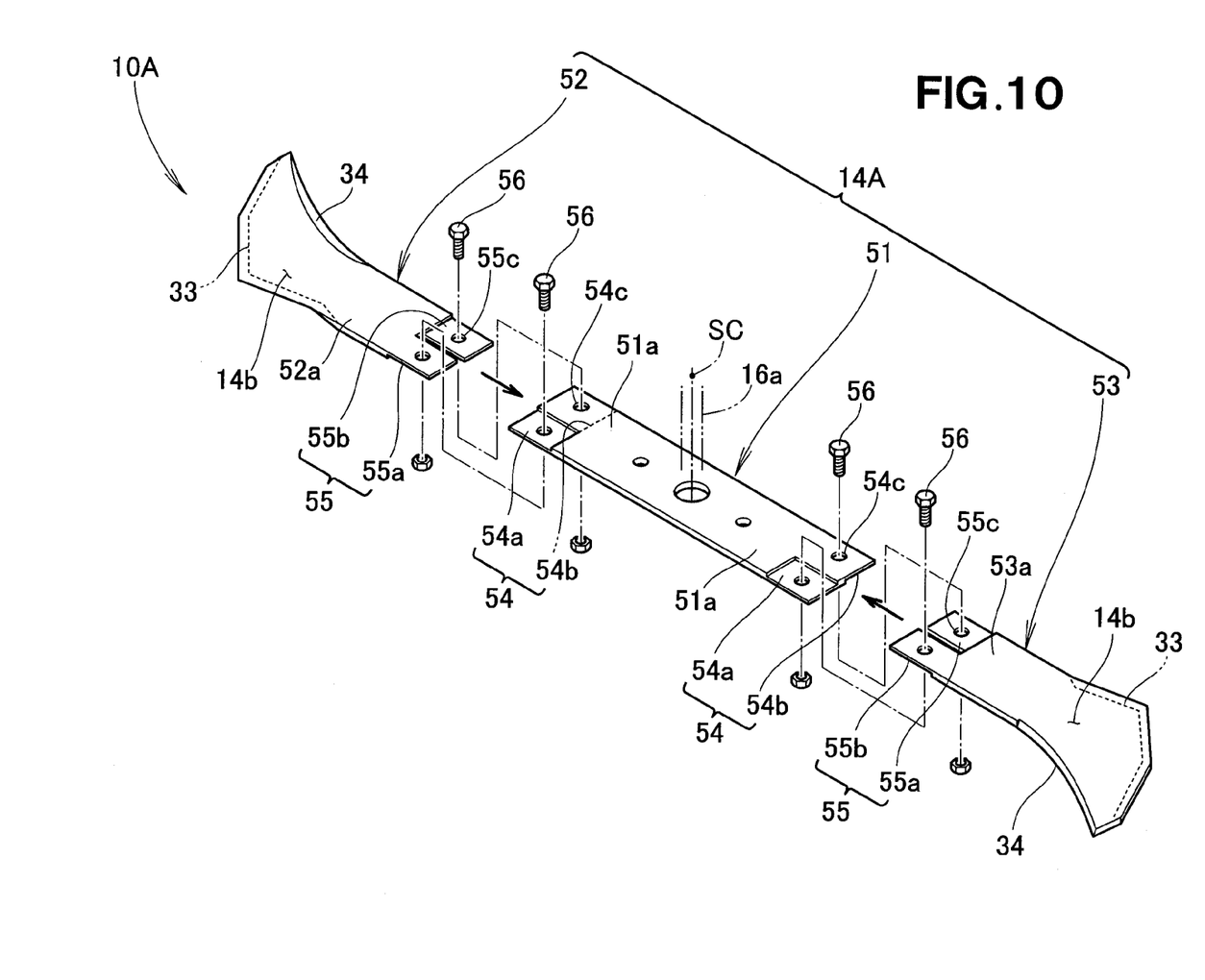
FIG. 10 is an exploded perspective view showing the upper cutter blade of FIG. 7 vertically turned over or turned back face up.

Further, as necessary, after removal of the bolts 56 and nuts 56, the two step surfaces 55a and 55b of the right end member 53 can be pulled away from the step surfaces 54a and 54b of the middle member 51. Then, the two step surfaces 55a and 55b of the right end member 53 can be re-inserted into the step surfaces 54a and 54b of the middle member 51 as shown in FIG. 10 after the right end member 53 is vertically reversed or turned over (back face up), and then the two step surfaces 55a and 55b and the step surfaces 54a and 54b being fastened together by means of the bolts 56 and the nuts 56. The left end member 52 can be connected to the middle member 51 and vertically turned over with respect to the middle member 51 in a similar manner to the right end member 53, although not described in detail here.

FIG. 10 shows the upper cutter blade 14A where each of the end members 52 and 53 has been vertically turned over with respect to the middle member 51. As seen from FIG. 10, the orientations of the two convex blade sections 33 and the two concave blade sections 34 can be changed without the middle member 51 being turned over.

Figure 11:
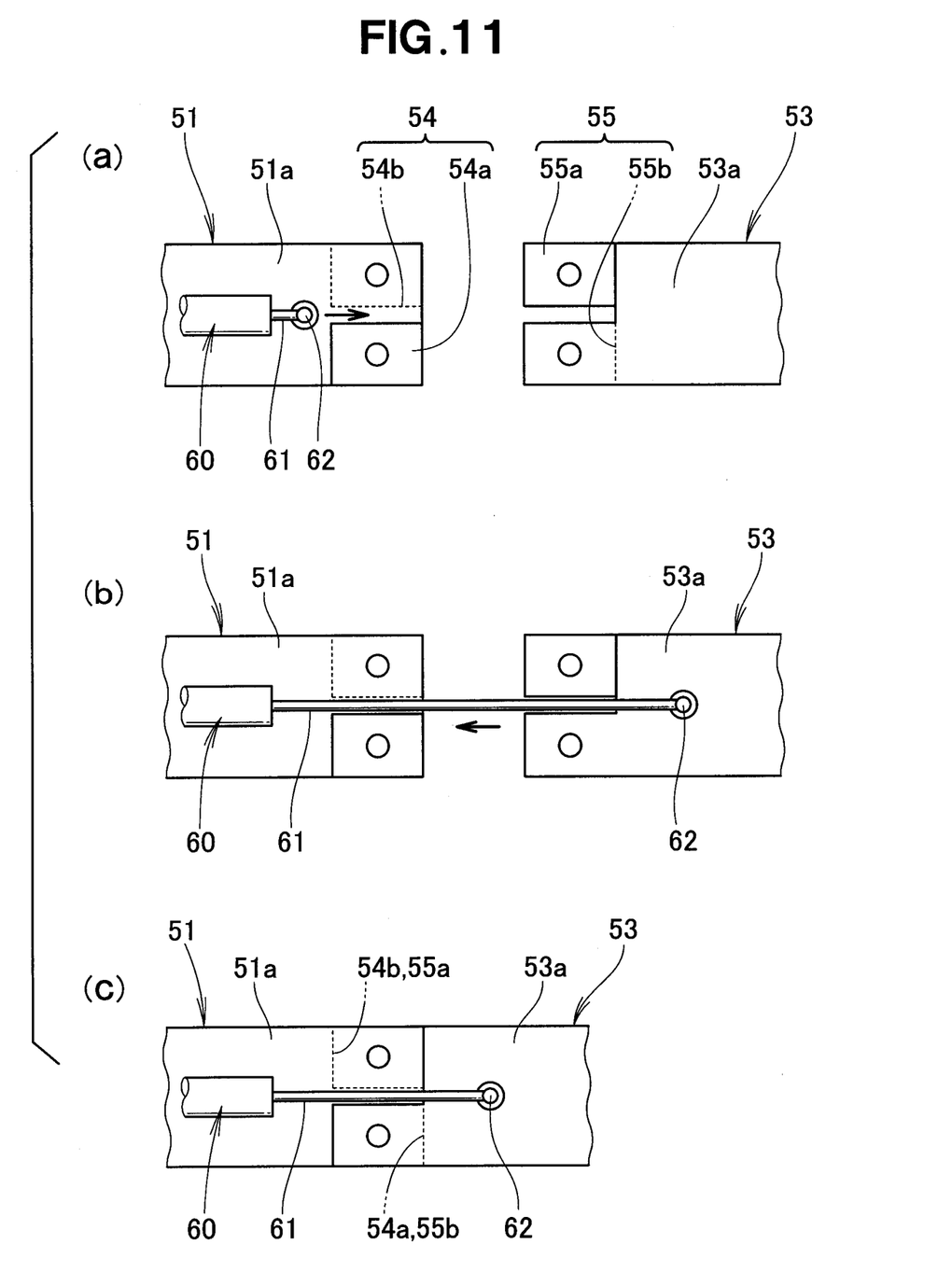
FIG. 11 is a view explanatory of a manner in which the middle member and the right end member shown in FIG. 7 are connected together by use of a switching mechanism.

The vertical turning-over (front-back switching) of each of the end members 52 and 53 with respect to the middle member 51 can be performed by use of a switching mechanism 60 shown in FIG. 11. The turning-over (front-back switching) using the switching mechanism 60 is performed in the following manner.

First, the two step surface 55a and 55b of the right end member 53 are positioned in alignment with the two step surfaces 54a and 54b of the middle member 51, as shown in FIG. 11(a). Similarly, the two step surface 55a and 55b of the left end member (one end member) 52 are positioned in alignment with the two step surfaces 54a and 54b of the middle member 51, as shown in FIG. 7. After that, the switching mechanism 60 is set onto one of the surfaces of the middle member 51.

Then, a piston 61 of the switching mechanism 60 is extended to the right end member 53, and a distal end portion 62 is sucked to one of the surfaces of the right end member 53. Next, the piston 61 of the switching mechanism 60 is pulled back, so that the two step surface 55a and 55b of the right end member 53 are inserted into the two step surfaces 54a and 54b of the middle member 51 as shown in FIG. 11(c). After that, the switching mechanism 60 is removed from the switching mechanism 60.

Finally, the two step surface 55a and 55b of the right end member 53 are fastened to the two step surfaces 54a and 54b of the middle member 51 by means of the bolts and nuts (see FIG. 9). In this manner, the right end member 53 is connected to the middle member 51. As necessary, the left end member 54 can be connected to the middle member 51 similarly to the right end member 53.

The second embodiment can achieve the same behavior and advantageous benefits as the first embodiment. In addition, according to the second embodiment, the orientations of the convex blade sections 33 and the concave blade sections 34 can be changed with ease by only the left and right end members 52 and 53 being vertically turned over without the middle member 51 being vertically turned over.

The basic principles of the present invention are well suited for application to walk-behind lawn mowers.

What is claimed is:

1. A lawn mower comprising:
   a rotation shaft accommodated in a downwardly-opening housing and extending vertically in the housing; and
   a cutter blade accommodated in the housing and rotatably mounted on the rotation shaft,
   the cutter blade being an elongated flat plate shaped member extending in opposite horizontal directions with respect to the rotation shaft, the cutter blade having first and second surfaces facing in opposite axial directions of the rotation shaft and having two bent sections formed on respective ones of longitudinally opposite end portions thereof,
   the two bent sections being bent in opposite directions as viewed in the axial direction of the rotation shaft,
   the cutter blade having, on each of the bent sections, a convex cutter blade section formed along a convex edge of the bent section and a concave cutter blade section formed along a concave edge of the bent section, the convex and concave edges of each bent section converging toward one another with a portion of the convex edge defining a longitudinal end surface of the cutter blade,
   the convex cutter blade section on each of the bent sections having a cutting edge angle as measured from the second surface smaller than a cutting edge angle as measured from the first surface of the concave cutter blade section,
   the convex cutter blade sections and the concave cutter blade sections on the two bent sections are single-side blade sections oriented in opposite axial directions with respect to the rotation shaft.

2. The lawn mower of claim 1, wherein each cutting edge of the convex cutter blade sections is formed by a horizontal edge portion of the second surface and slants upward toward the first surface, and each cutting edge of the concave cutter blade sections is formed by a horizontal edge portion of the first surface and slants downward toward the second surface.

3. The lawn mower of claim 1, wherein the cutter blade is configured to be rotatably mounted on the rotation shaft in one of a first position and a second position,
   in the first position the convex cutter blade sections are oriented forward in a rotating direction of the cutter blade, and
   in the second position the concave cutter blade sections are oriented forward in the rotating direction of the cutter blade.

4. The lawn mower of claim 1, wherein the cutter blade is defined by a middle member and the end portions which are detachably connected to opposite end portions of the middle member, and
   wherein vertically reversing or tuning over the end portions with respect to the middle member changes the orientations of the convex cutter blade sections and the concave cutter blade sections.

* * * * *